(12) United States Patent
Johnson et al.

(10) Patent No.: US 12,016,105 B2
(45) Date of Patent: Jun. 18, 2024

(54) HOME APPLIANCE CAVITY

(71) Applicants: BSH Home Appliances Corporation, Irvine, CA (US); BSH Hausgeräte GmbH, Munich (DE)

(72) Inventors: Sean Johnson, New Bern, NC (US); Kenneth Jones, Washington, NC (US); Robert Parchman, Newport, NC (US)

(73) Assignees: BSH Home Appliances Corporation, Irvine, CA (US); BSH Hausgeräte GmbH, Munich (DE)

( * ) Notice: Subject to any disclaimer, the term of this patent is extended or adjusted under 35 U.S.C. 154(b) by 1049 days.

(21) Appl. No.: 16/693,415

(22) Filed: Nov. 25, 2019

(65) Prior Publication Data

US 2021/0160972 A1    May 27, 2021

(51) Int. Cl.
*H05B 6/64* (2006.01)
*B29C 70/46* (2006.01)
*B29L 31/00* (2006.01)
*F27D 1/00* (2006.01)

(52) U.S. Cl.
CPC .......... *H05B 6/6402* (2013.01); *B29C 70/46* (2013.01); *F27D 1/00* (2013.01); *B29L 2031/762* (2013.01); *F27D 1/0009* (2013.01)

(58) Field of Classification Search
CPC ....... H05B 6/6402; B29C 70/46; B29C 70/30; B29L 2031/762; F27D 1/00; F27D 1/0009
See application file for complete search history.

(56) References Cited

U.S. PATENT DOCUMENTS

| 4,854,952 | A | | 8/1989 | Stepien | |
|---|---|---|---|---|---|
| 5,361,686 | A | * | 11/1994 | Koopman | A47J 37/042 219/400 |
| 5,512,737 | A | | 4/1996 | Miklos | |
| 5,693,242 | A | * | 12/1997 | Sanchez | F24C 15/322 219/400 |
| 7,856,850 | B2 | | 12/2010 | Gille et al. | |
| 8,794,226 | B2 | | 8/2014 | Schmidbauer et al. | |
| 9,625,162 | B2 | * | 4/2017 | Yoshimura | F24C 15/322 |

(Continued)

FOREIGN PATENT DOCUMENTS

| CN | 102237236 | A | * | 11/2011 |
|---|---|---|---|---|
| CN | 107874640 | A | | 4/2018 |

(Continued)

OTHER PUBLICATIONS

Mold Construction Guide, Jan. 10, 2018, Fibre Glast, <https://web.archive.org/web/20180110014146/http://www.fibreglast.com/product/mold-construction> (Year: 2018).*

(Continued)

*Primary Examiner* — Brian W Jennison
*Assistant Examiner* — Kristina J Babinski
(74) *Attorney, Agent, or Firm* — Michael E. Tschupp; Andre Pallapies; Brandon G. Braun

(57) ABSTRACT

A home appliance, in particular a home cooking appliance, includes a home appliance cavity used as a cooking cavity. The home appliance cavity includes a substrate that is a fibrous matrix and an inorganic resin that is thermally resistant. In certain examples, the home appliance cavity is a single unit construction, eliminating assembly seams. Also described herein are methods of making the home appliance cavity.

20 Claims, 3 Drawing Sheets

(56) References Cited

U.S. PATENT DOCUMENTS

| | | | |
|---|---|---|---|
| 10,371,388 B2 * | 8/2019 | Hofmann | F24C 15/08 |
| 2015/0233585 A1 | 8/2015 | Creel | |
| 2022/0065464 A1 * | 3/2022 | Abe | B32B 1/00 |

FOREIGN PATENT DOCUMENTS

| | | | |
|---|---|---|---|
| DE | 19853780 A1 * | 1/2000 | F24C 15/322 |
| EP | 0744580 A1 | 11/1996 | |
| GB | 2179441 A | 3/1987 | |
| GB | 2331357 A | 5/1999 | |

OTHER PUBLICATIONS

Paul Mueller, Resin Curing Temperature, Oct. 23, 2018, <https://www.powerblanket.com/blog/resin-curing-temperature/#Resin_Curing_Temperature_Room_Temperature_vs_Added_Heat> (Year: 2018).*

Convection, Dec. 7, 2018, Wikipedia (Year: 2018).*

Photo(Light) Curing Resins, Dec. 13, 2017, Adeka, <https://web.archive.org/web/20171213041929/http://www.adeka.co.jp:80/en/chemical/pickup/pickup06.html> (Year: 2017).*

Chemically Cured Resin, 2012, Farlex, Medical Dictionary, <https://medical-dictionary.thefreedictionary.com/chemically+cured+resin> (Year: 2012).*

Tanmay Basak et al., Heat flow analysis for natural convection within trapezoidal enclosures based on heatline concept, Mar. 4, 2009, International Journal of Heat and Mass Transfer, vol. 52, pp. 2471-2483 (Year: 2009).*

Mold Construction Guide, Aug. 7, 2020, Fibre Glast, <https://web.archive.org/web/20200807090300/https://www.fibreglast.com/product/mold-construction> (Year: 2020).*

Whirlpool Electric Range User Instructions W11333124A, Mar. 2019, Whirlpool (Year: 2019).*

Rayleigh-Bénard convection, May 4, 2023, Wikipedia, <https://en.wikipedia.org/wiki/Rayleigh%E2%80%93B%C3%A9nard_convection? (Year: 2023).*

* cited by examiner

HOME APPLIANCE CAVITY

TECHNICAL FIELD

The present disclosure relates to home appliances and, in particular, cavities that can minimize heat loss for home appliances.

BACKGROUND

Home appliances, such as cooking appliances, including ovens and ranges, typically employ a cavity made from porcelain-coated steel wrapped in a high R-value insulation. The cavity is typically formed by assembling porcelain-coated steel panels to provide the cavity, creating seams susceptible to heat loss. Additionally, the steel panels are thermally conductive and can extract heat from the interior of the cavity. Additional insulation may be needed for the cavity to reduce or prevent heat loss.

SUMMARY

In one example, a home appliance cavity includes a shaped composite material. The shaped composite material includes a substrate and an inorganic resin.

In another example, a method of producing the home appliance cavity includes conforming a substrate to a mold, impregnating the substrate with an inorganic resin to form an uncured composite home appliance cavity, curing the uncured composite home appliance cavity to form a cured home appliance cavity, and removing the cured home appliance cavity from the mold to form the home appliance cavity.

DETAILED DESCRIPTION

Certain aspects and features relate to a cavity for a home appliance in which the cavity can be formed from a shaped composite material that includes a substrate and an inorganic resin. The shaped composite material can be provided by shaping the substrate (e.g., molding, bending, forming, or the like) prior to adding the inorganic resin. A shape of the shaped composite material can depend on a flexibility of the substrate. Forming the cavity from the shaped composite material can afford a manufacturer the ability to create a cavity from a single material instead of assembling a plurality of panels to create a cavity. Using an inorganic resin can result in a more thermally efficient home appliance cavity.

A cavity formed from shaped composite material can serve as a home appliance cavity (e.g., a cooking cavity) and a thermal insulator. The cavity, when used as a cooking cavity, can be an enclosure containing a heat source to provide heat, as well as a holder for a food item to be cooked from the heat. Further, the cavity can be a barrier between a cooking environment and any environment exterior to the cooking environment (e.g., a kitchen, a cooktop of a free-standing range, cabinetry surrounding a wall-mounted oven, a remainder of an appliance containing the cavity, or any combination thereof). In certain examples, creating the cavity from the shaped composite material eliminates any need for additional thermal insulation (e.g., porcelain-coated steel wrapped in a high R-value insulation) or protective liners (e.g., thermally resistant and spill-resistant liners). In other aspects, the cavity created from the shaped composite material is a single unit construction devoid of assembly seams (i.e., the cavity is not provided by joining a plurality of panels to form the cavity). In another aspect, the cavity is a single unit construction in which the cavity defines a cooking cavity that is a thermal insulator.

Figure 1:
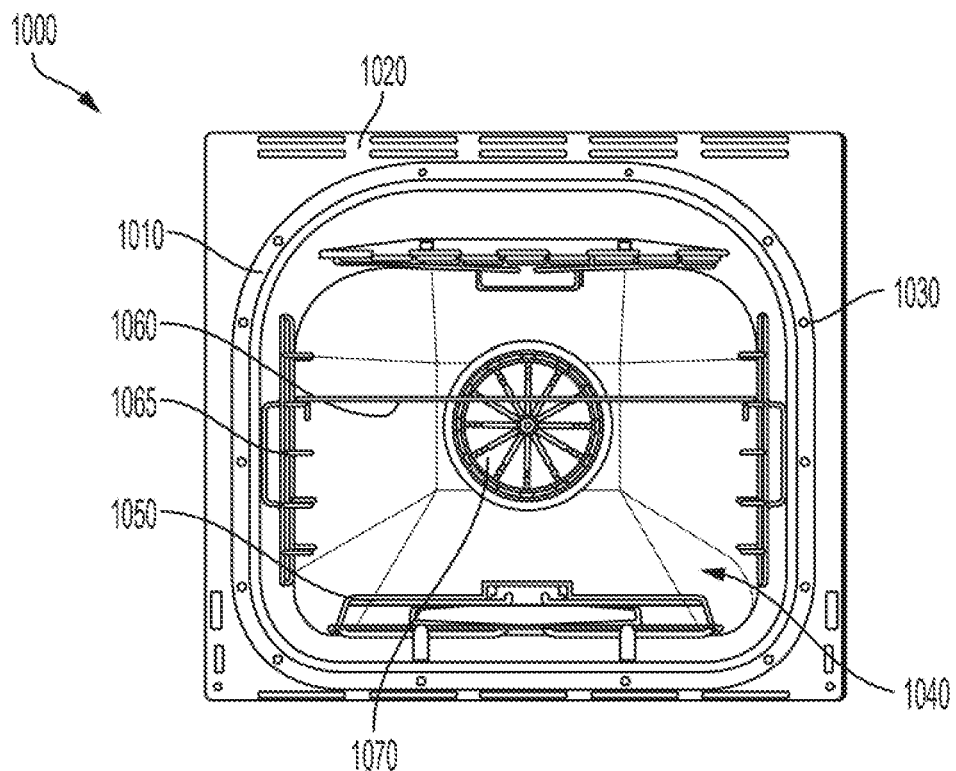
FIG. 1 is an illustration of a front view of a home appliance cavity according to one example of the present disclosure.

FIG. 1 illustrates a home appliance cavity 1000 according to one example of the present disclosure. In certain aspects, the home appliance cavity 1000 includes a mounting frame 1010 configured to secure the home appliance cavity to a home appliance structure 1020. Additionally, the mounting frame can include at least one mounting hole 1030 configured to provide an attachment point that can allow a fastener to engage the home appliance structure 1020. In some cases, the home appliance cavity 1000 can include a plurality of the mounting holes 1030. In certain examples, the home appliance cavity 1000 can include a concave cavity 1040. Examples of the concave cavity 1040 can include a cooking cavity (e.g., a convection oven cavity, a warming oven cavity, an electric oven cavity, a natural gas oven cavity, a propane oven cavity, a pressure cooker cavity, a toaster oven cavity, a microwave oven cavity, a slow-cooker cavity, a fryer cavity, a dutch oven, any suitable cooking cavity, or any combination thereof), a refrigeration cavity (e.g., a refrigerator cavity, a freezer cavity, a cooler cavity, any suitable refrigeration cavity, or any combination thereof), a clothes dryer cavity, a water heater tank, a kiln, any suitable thermal cavity, or any combination thereof.

Figure 2:
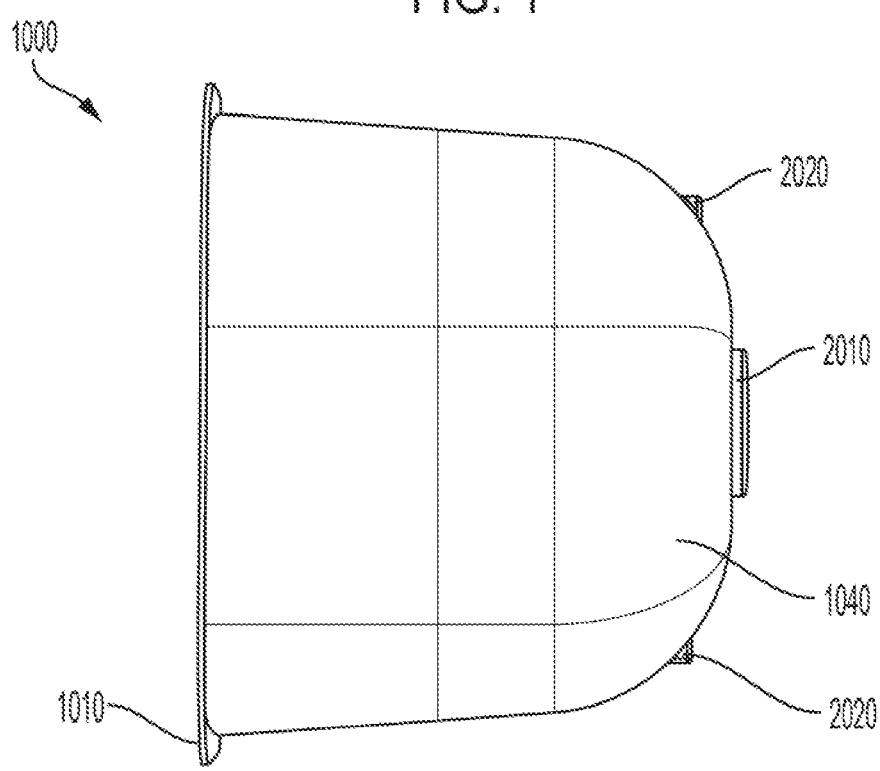
FIG. 2 is an illustration of a side view of a home appliance cavity according to one example of the present disclosure.

The mounting frame 1010 and the concave cavity 1040 can be formed from a single material sheet to provide a single unit construction. FIG. 2 is a side view of the home appliance cavity 1000 illustrating the mounting frame 1010 and the concave cavity 1040 according to one example of the present disclosure. The concave cavity 1040 can include a light access port 2010 and at least one mounting stabilizer protrusion 2020, as shown in FIG. 2. The light access port 2010 can supply electric energy to a light source mounted within the home appliance cavity 1000. The mounting stabilizer protrusion 2020 can support the rear of the home appliance cavity 1000 when the home appliance cavity 1000 is mounted in a home appliance. As shown in FIG. 2, the mounting frame 1010 and concave cavity 1040 can be in a single unit construction devoid of any assembly seams, joints, couplings, or the like. In certain examples, the home appliance cavity 1000 is formed from a single material sheet. The forming process can include, but is not limited to, molding, extruding, press forming (e.g., hot forming, warm forming, cold forming, or a combination of these), drawing, deep drawing, any suitable single sheet forming process, or any combination thereof. In some cases, the home appliance cavity 1000 is formed from a composite material, for example, a substrate and an inorganic resin, to provide a shaped composite material. The substrate may include a fibrous matrix (e.g., a ceramic fiber, a carbon fiber, a glass fiber, or any combination thereof). The fibrous matrix may include a woven fabric (e.g., a woven ceramic fiber fabric, a woven carbon fiber fabric, a woven glass fiber fabric, or any combination thereof).

In some cases, the inorganic resin is a curable inorganic resin. In certain aspects, the curable inorganic resin can be a thermally cured inorganic resin, a photo-cured inorganic resin, a chemically cured inorganic resin, or any combination thereof. For example, curing the inorganic resin (e.g., curing the uncured composite home appliance cavity) can include thermal curing, ultraviolet (UV) light curing, chemical curing, any suitable curing technique, or any combination thereof. In certain examples, the thermally cured inorganic resin is cured by heating the uncured composite home appliance cavity to a curing temperature and maintaining the curing temperature for a period of time as required by thermal properties of the inorganic resin. In certain cases, the thermally cured inorganic resin can be cured without heating, for example, the thermally-cured inorganic resin cures at about room temperature. Additionally, the photo-cured inorganic resin can be cured by exposure to UV light. In some other cases, the chemically-cured inorganic resin can be cured by applying a curing solution to the uncured composite home appliance cavity. Accordingly, the properties and composition of the inorganic resin used to provide the composite home appliance cavity can prescribe the curing technique used to provide the composite home appliance cavity.

In certain aspects, the cured inorganic resin can have a range of glass transition temperatures ($T_g$), each value in the range having a value of at least 1075° C. (e.g., at least about 1080° C., at least about 1085° C., at least about 1090° C., at least about 1095° C., or at least about 2000° C.). Thus, the home appliance cavity 1000 described herein, formed from a substrate and a high $T_g$ thermally cured inorganic resin is amenable to high temperature applications including cooking (e.g., roasting, baking, broiling, toasting, or the like) and self-cleaning applications (e.g., heating the home appliance cavity 1000 to temperatures greater than the degradation temperature of various food products). Further, the thermally cured inorganic resin can have a low thermal conductivity (i.e., a high thermal resistance) when compared to other cavities, enabling the home appliance cavity 1000 to retain heat (e.g., when the home appliance cavity is used as a cooking cavity), and require less energy to heat the interior of the home appliance cavity 1000.

For example, the thermally cured inorganic resin can have a thermal conductivity of from about 0.4 Watts per meter-Kelvin (W/m·K) to about 0.7 W/m·K (e.g., about 0.4 W/m·K, about 0.41 W/m·K, about 0.42 W/m·K, about 0.43 W/m·K, about 0.44 W/m·K, about 0.45 W/m·K, about 0.46 W/m·K, about 0.47 W/m·K, about 0.48 W/m·K, about 0.49 W/m·K, about 0.5 W/m·K, about 0.51 W/m·K, about 0.52 W/m·K, about 0.53 W/m·K, about 0.54 W/m·K, about 0.55 W/m·K, about 0.56 W/m·K, about 0.57 W/m·K, about 0.58 W/m·K, about 0.59 W/m·K, about 0.6 W/m·K, about 0.61 W/m·K, about 0.62 W/m·K, about 0.63 W/m·K, about 0.64 W/m·K, about 0.65 W/m·K, about 0.66 W/m·K, about 0.67 W/m·K, about 0.68 W/m·K, about 0.69 W/m·K, or about 0.7 W/m·K.). Conversely, other cavities (e.g., steel cavities) have a thermal conductivity of about 60 W/m·K.

Additionally, the single unit construction, as shown in the example of FIG. 2, can provide a solid single unit devoid of seams and other joints that allow heat to escape, for example, when the home appliance cavity 1000 is used as a cooking cavity. Heat transfer through a medium (e.g., an oven cavity, oven walls, or seams created by joining oven wall panels to form an oven cavity) is described in Equation 1 below:

$$Q = \frac{A(T_i - T_o)}{R}, \quad \text{Eq. 1}$$

where Q is the heat transfer, A is the surface area being measured (e.g., the surface area of the home appliance cavity 1000, the surface area of an oven wall, or the surface area of the seam(s)), $T_i$ is the temperature inside the home appliance cavity 1000, $T_0$ is the temperature outside the home appliance cavity 1000, and R is the thermal resistance of the material at the area being measured. Heat transfer is inversely proportional to the thermal resistance of the material at the area being measured. A seam can have a significantly reduced thermal resistance when compared to the remainder of an oven cavity, thus reducing the ability of the oven cavity to retain heat and efficiently operate and perform. A home appliance cavity 1000 according to some examples, being devoid of seams and provided using the thermally resistant substrate and organic resin, can be significantly more efficient than other cavities.

Additionally, the thermally cured inorganic resin can provide an interior surface that does not require an additional liner for insulation. In some examples, the thermally cured inorganic resin has a low thermal conductivity as described above and the home appliance cavity 1000 does not require a thermally insulating liner. In further examples, the thermally cured inorganic resin can provide a non-stick surface that is resistant to spills and subsequent adhesion of burned or charred cooking byproducts. The home appliance cavity 1000 according to some examples does not require a protective liner to prevent build-up of spilled food products within the home appliance cavity 1000.

Figure 3:
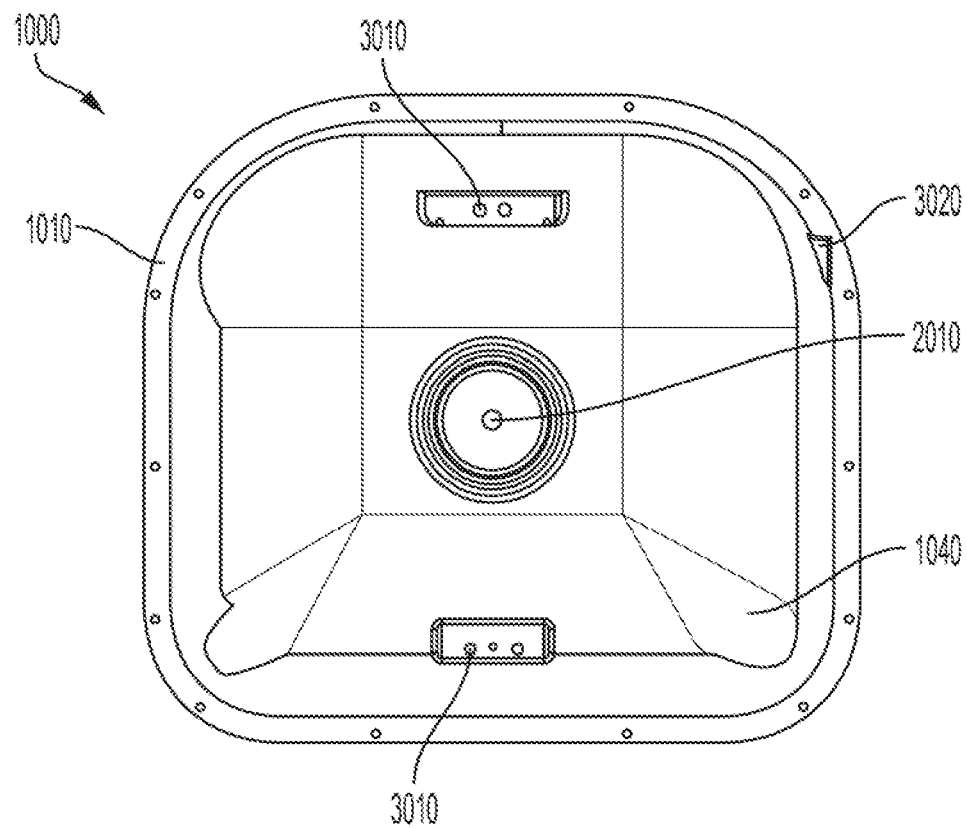
FIG. 3 is an illustration of a rear view of a home appliance cavity according to one example of the present disclosure.

In further examples, when the home appliance cavity 1000 is used as a cooking cavity, the concave cavity 1040 is configured to support at least one heating element 1050, as shown in FIG. 1. In certain aspects, the home appliance cavity includes access ports to, for example, supply energy to the heating element 1050. FIG. 3 is a rear view of the home appliance cavity 1000 according to one example of the present disclosure. The home appliance cavity 1000 can have an energy source access port 3010. The energy source access port 3010 can supply electric energy, fuel (e.g., natural gas or propane), any suitable energy, or any combination thereof to the heating element 1050. For example, the energy source access port 3010 can supply natural gas to a gas burner, or the energy source access port 3010 can supply electric energy to an electric heating element. Additionally, the home appliance cavity 1000 can include an exhaust port 3020. The exhaust port 3020 can extract cooking exhaust (e.g., steam, smoke, cooking byproducts, self-cleaning byproducts, or any combination thereof) from the home appliance cavity 1000 when the home appliance cavity 1000 is used as a cooking cavity.

In some cases, the home appliance cavity 1000 can include a mounting system to support at least one cooking rack 1060 within the home appliance cavity 1000, as shown in FIG. 1. The cooking rack 1060 can be supported by a rack rail system 1065 to support the cooking rack 1060 at various heights within the home appliance cavity 1000. In certain cases, the rack rail system 1065 can be mounted to the home appliance cavity 1000 by any suitable means (e.g., the rack rail system 1065 can be fastened to the home appliance cavity 1000, the rack rail system 1065 can be molded into to the home appliance cavity 1000 during the molding process described herein, or any combination thereof). In some aspects, the cooking rack 1060 can be fastened to the home appliance cavity 1000 to provide a non-adjustable rack. In some further embodiments, the cooking rack 1060 can be supported by rails molded into the home appliance cavity 1000, the cooking rack 1060 can be supported by hooks mounted to the home appliance cavity 1000, or the cooking rack 1060 can be supported by retractable keys configured to engage slots positioned within the home appliance cavity 1000. The cooking rack 1060 can be supported by any suitable rack support means, or any combination thereof.

In some cases, the home appliance cavity 1000 can include at least one light 1070 as shown in FIG. 1. For example, the light 1070 can be an incandescent light (e.g., an appliance light bulb), a fluorescent light, a light-emitting diode (LED) light, a quantum dot LED (QLED), any suitable light source, or any combination thereof.

Figure 4:
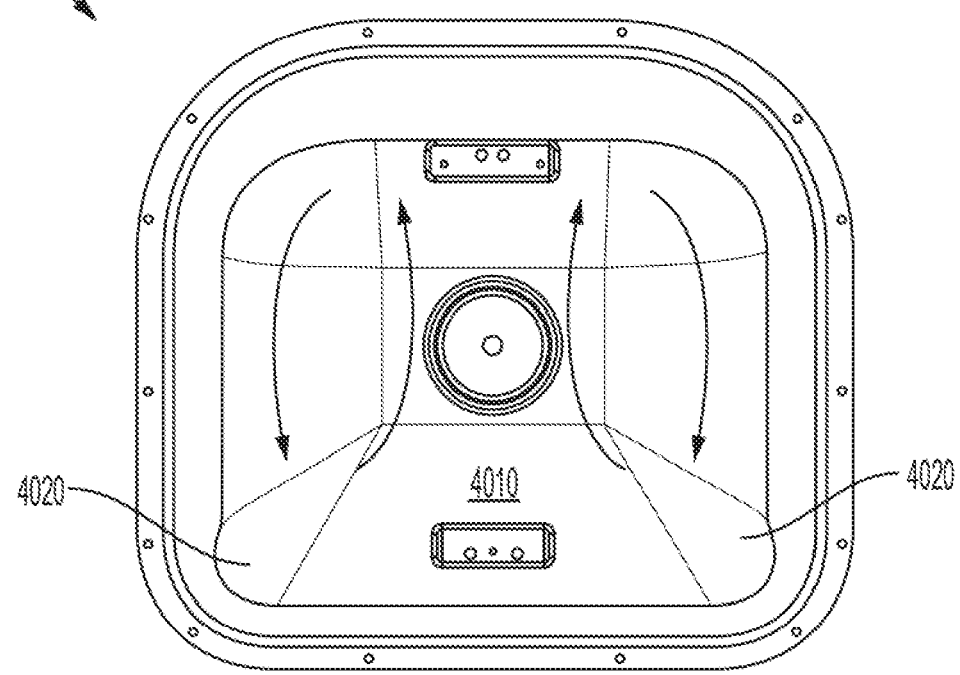
FIG. 4 is an illustration of a front view of a home appliance cavity according to one example of the present disclosure.

In certain aspects, the concave cavity 1040 is configured to provide a natural convective air flow within the concave cavity 1040, as shown in FIG. 4. In some examples, the concave cavity 1040 can include a bottom portion 4010 having a trapezoidal shape having a planar apex spanning a portion of the width of the home appliance cavity 1000. Sloped portions 4020 of the trapezoidal bottom portion 4010 can guide the convective air flow (indicated by bold arrows in FIG. 4) as cooler air descends along the sides of the home appliance cavity 1000 and, upon heating from a heating element 1050 mounted at the bottom of the home appliance cavity 1000 as shown in FIG. 1, heated air rises at about a center of the home appliance cavity 1000. Thus, the home appliance cavity 1000 may not require a fan to force a convective air flow.

Figure 5:
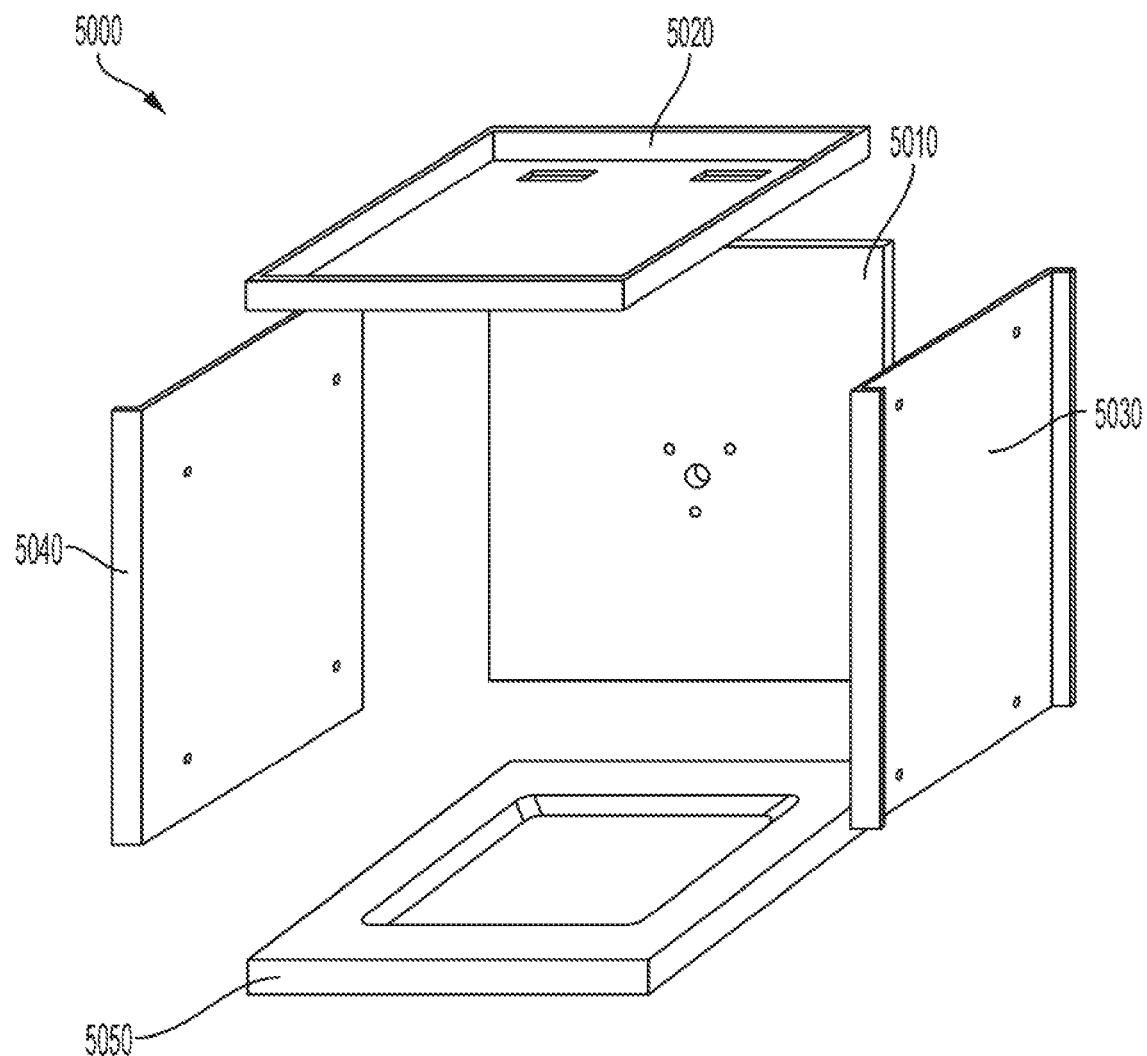
FIG. 5 is an illustration of an exploded perspective view of a home appliance cavity according to one example of the present disclosure.

Optionally, the substrate (e.g., a fibrous matrix) and the inorganic resin can be formed into panels to provide a cubic home appliance cavity 5000 as shown in FIG. 5. The substrate and the inorganic resin can be formed into a rear panel 5010, a top panel 5020, at least one side panel, including a right side panel 5030 and a left side panel 5040, and a bottom panel 5050. Optionally, the substrate and the inorganic resin can be formed into a door panel (not shown). The rear panel 5010, the top panel 5020, the right side panel 5030, the left side panel 5040, and the bottom panel 5050 can be joined together to provide the cubic home appliance cavity 5000. Further, the cubic home appliance cavity 5000, including the thermally resistant panels created from the substrate and inorganic resin, can be significantly more efficient than other cavities.

In certain examples, methods of providing a home appliance cavity 1000 can include providing a substrate; providing an inorganic resin; conforming the substrate to a mold; impregnating the substrate with the inorganic resin to provide an uncured composite home appliance cavity; curing the uncured composite home appliance cavity to provide a cured home appliance cavity; and removing the cured home appliance cavity from the mold to provide the home appliance cavity 1000.

The substrate can be a fibrous matrix (e.g., a ceramic fiber, a carbon fiber, a glass fiber, or any combination thereof), and the inorganic resin can be a thermally cured inorganic resin. The home appliance cavity 1000 may be formed by conforming the substrate (e.g., the fibrous matrix) to a mold having a desired shape as shown in FIGS. 1-4. Conforming the substrate to the mold can include either (i) placing the substrate onto a convex mold, or (ii) placing the substrate into a concave mold. After conforming the substrate to the mold, the substrate can be impregnated with the inorganic resin. In the example of conforming the substrate onto a convex mold, impregnating the substrate with the inorganic resin can include depositing the inorganic resin over the substrate and the convex mold, absorbing the inorganic resin into the substrate to encapsulate the substrate within the inorganic resin, and curing the inorganic resin. In the example of conforming the substrate into a concave mold, impregnating the substrate with the inorganic resin can include depositing the inorganic resin over the substrate and into the concave mold, absorbing the inorganic resin into the substrate to encapsulate the substrate within the inorganic resin, and curing the inorganic resin.

Curing the inorganic resin (e.g., curing the uncured composite home appliance cavity) can include thermal curing, ultraviolet (UV) light curing, chemical curing, any suitable curing technique, or any combination thereof. For example, thermal curing can include heating the uncured composite home appliance cavity to a curing temperature and maintaining the curing temperature for a period of time as required by thermal properties of the inorganic resin. After heating to the curing temperature and maintaining the curing temperature, the curing process can include cooling the composite home appliance cavity to about room temperature. Cooling can be performed by any one of air cooling, forced air cooling, compressed air cooling, compressed gas cooling (e.g., compressed nitrogen, compressed helium, compressed carbon dioxide, or the like), or water quenching. In certain examples, removing the cured home appliance cavity from the mold can include extracting a convex mold from the cured home appliance cavity or extracting the cured home appliance cavity from a concave mold.

In certain cases, the inorganic resin can cure without heating, for example, when using a thermally-cured inorganic resin that cures at about room temperature. Additionally, a photo-cured inorganic resin can be cured by exposure to UV light. In some other cases, a chemically-cured inorganic resin can be cured by applying a curing solution to the uncured composite home appliance cavity. Accordingly, the curing step can be performed by applying any curing means as required by the inorganic resin used to provide the composite home appliance cavity.

In other examples, the cured home appliance cavity can be subjected to various finishing processes to provide the home appliance cavity 1000. In some cases, a finishing process can include moving excess cured inorganic resin to provide a smooth home appliance cavity 1000, removing protruding substrate (e.g., areas where the substrate is not fully encapsulated by the inorganic resin), or a combination of these and other processes. The other processes may include providing accessory installation detents (e.g., providing threaded fastener receiving holes), providing mounting points (e.g., mounting points for the rack rail system 1065, mounting points for the light 1070, or mounting points for the heating element 1050), providing access ports described above, providing any desired component, or any combination thereof.

The description is provided in relation to several examples that may share common characteristics and features. It is to be understood that one or more features of any one example may be combined with one or more features of the other examples. In addition, any single feature or combination of features in any of the examples may constitute additional examples.

Throughout this disclosure, terms such as first, second, etc. may be used. However, these terms are not intended to be limiting or indicative of a specific order, but instead are used to distinguish similarly described features from one another, unless expressly noted otherwise. Terms such as "substantially" and "about" are intended to allow for variances to account for manufacturing tolerances, measurement tolerances, or variations from ideal values that would be acceptable.

Throughout this disclosure, the terms top, bottom, front, back, left and right may be used. These terms are only intended to provide relational orientation with respect to one another. For example, any two opposed sides can be a right side and a left side and by changing to an opposed viewpoint, right versus left will be changed. Thus, top, bottom, front, back, left, and right should not be considered limiting and are used only to distinguish their relationship to one another.

As used herein, the meaning of "room temperature" can include a temperature of from about 15° C. to about 30° C., for example about 15° C., about 16° C., about 17° C., about 18° C., about 19° C., about 20° C., about 21° C., about 22° C., about 23° C., about 24° C., about 25° C., about 26° C., about 27° C., about 28° C., about 29° C., or about 30° C.

All ranges disclosed herein are to be understood to encompass any and all endpoints as well as any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10.

While the present technology has been described in connection with several practical examples, it is to be understood that the technology is not to be limited to the disclosed examples, but on the contrary, is intended to cover various modifications and equivalent arrangements included within the spirit and scope of the technology.

What is claimed is:

1. A home appliance cavity, comprising:
a concave outer shape formed from a shaped composite material, wherein the shaped composite material comprises an inorganic resin and a substrate configured to be impregnated by the inorganic resin, wherein the substrate is a single material sheet, and wherein the home appliance cavity is devoid of an assembly seam; and
a bottom portion of the concave outer shape, the bottom portion being formed of the shaped composite material and having a trapezoidal shape with sloped portions configured to guide convective air flow.

2. The home appliance cavity of claim 1, wherein the substrate comprises a fibrous matrix.

3. The home appliance cavity of claim 2, wherein the fibrous matrix comprises a ceramic fiber, a carbon fiber, a glass fiber, or any combination thereof.

4. The home appliance cavity of claim 2, wherein the fibrous matrix comprises a woven ceramic fiber fabric.

5. The home appliance cavity of claim 1, wherein the inorganic resin comprises a cured inorganic resin.

6. The home appliance cavity of claim 5, wherein the cured inorganic resin comprises a thermally cured inorganic resin, a photo-cured inorganic resin, or a chemically cured inorganic resin.

7. The home appliance cavity of claim 5, wherein the cured inorganic resin has a glass transition temperature of at least 1075° C.

8. The home appliance cavity of claim 5, wherein the cured inorganic resin comprises a photo-cured inorganic resin.

9. The home appliance cavity of claim 1, wherein the home appliance cavity is devoid of a liner and additional thermal insulation.

10. The home appliance cavity of claim 9, comprising:
a mounting frame configured to secure the home appliance cavity to a home appliance structure, wherein the mounting frame comprises at least one mounting hole configured to provide an attachment point configured to allow a fastener to engage the home appliance structure;
the concave cavity, wherein the mounting frame and the concave cavity are formed from the single material sheet, wherein the concave cavity is configured to support at least one heating element, at least one rack, and at least one light, and wherein the concave cavity is configured to provide the convective air flow within the concave cavity;
at least one access port configured to supply energy for the at least one heating element;
a light access port configured to supply energy for the at least one light; and
an exhaust port configured to remove exhaust from the home appliance cavity.

11. A method of producing a home appliance cavity, comprising:
conforming a substrate to a mold;
impregnating the substrate with an inorganic resin to form an uncured composite home appliance cavity;
curing the uncured composite home appliance cavity to form a cured home appliance cavity; and
removing the cured home appliance cavity from the mold to form the home appliance cavity, wherein the home appliance cavity is formed from a single material sheet and is devoid of any assembly seams, and wherein the home appliance cavity comprises a concave outer shape with a bottom portion having a trapezoidal shape with sloped portions to guide convective air flow.

12. The method of claim 11, wherein the substrate comprises a fibrous matrix comprising a ceramic fiber, a carbon fiber, a glass fiber, or any combination thereof.

13. The method of claim 11, wherein impregnating the substrate with the inorganic resin comprises impregnating the substrate with a curable inorganic resin.

14. The method of claim 11, wherein the home appliance cavity is devoid of a liner and additional thermal insulation.

15. The method of claim 11, wherein impregnating the substrate with the inorganic resin comprises depositing the inorganic resin over the substrate and absorbing the inorganic resin into the substrate.

16. The method of claim 15, wherein impregnating the substrate with the inorganic resin further comprises encapsulating the substrate within the inorganic resin.

17. The method of claim 11, wherein curing the uncured composite home appliance cavity comprises thermal curing, photo-curing, chemical curing, or any combination thereof.

18. The method of claim 17, wherein thermal curing the uncured composite home appliance cavity comprises heating the uncured composite home appliance cavity to a curing temperature required by a thermally-cured inorganic resin, maintaining the curing temperature for a period of time required by the thermally-cured inorganic resin, and cooling the cured home appliance cavity to a temperature between 15° C. to 30° C. after maintaining the curing temperature.

19. The method of claim 11, wherein the thermally cured inorganic resin has a glass transition temperature of at least 1075° C.

20. The method of claim 11, further comprising finishing the cured home appliance cavity, wherein finishing the cured home appliance cavity comprises removing excess cured inorganic resin, removing protruding substrate, providing accessory installation detents, providing mounting points, or any combination thereof.

* * * * *